United States Patent

Hofmann et al.

[11] 4,120,574
[45] Oct. 17, 1978

[54] PORTABLE MICROFILM READER

[75] Inventors: Wilfried Hofmann; Guenther Lueder, both of Taufkirchen; Walter Rauffer, Munich; John Krueger, Munich; Adolf Koopmann, Munich, all of Fed. Rep. of Germany

[73] Assignee: Agfa-Gevaert Aktiengesellschaft, Leverkusen, Fed. Rep. of Germany

[21] Appl. No.: 791,472

[22] Filed: Apr. 27, 1977

[30] Foreign Application Priority Data

Apr. 27, 1976 [DE] Fed. Rep. of Germany ....... 2618472

[51] Int. Cl.² .................. G03B 23/08; G03B 21/28
[52] U.S. Cl. .................. 353/27 R; 353/79; 353/98; 353/119
[58] Field of Search .................. 353/71, 72, 73, 77, 353/78, 79, 98, 119, 27 R

[56] References Cited

U.S. PATENT DOCUMENTS

| 3,667,839 | 6/1972 | Artand | 353/77 |
| 3,870,411 | 3/1975 | Schwartz | 353/73 |
| 3,899,246 | 8/1975 | Edelstein | 353/72 |

Primary Examiner—Steven L. Stephan

[57] ABSTRACT

Portable microfilm reader having a body with a microfilm holder, a projection lamp, a foldable reflecting mirror, a hinged cover, and a projection surface or screen on the inside of the cover. The invention provides means for automatically erecting the mirror when the cover is opened, and automatically folding the mirror when the cover is closed. Means is also provided for automatically turning the projection lamp off when the cover is closed.

6 Claims, 4 Drawing Figures

PORTABLE MICROFILM READER

This invention relates to a portable microfilm reader with a case having a lower body in which there is pivotally mounted a deflection mirror that deflects onto a projection surface the projection beam proceeding from the frame of the microfilm that is to be viewed, and with an upper, hollow cover of the case pivotally attached to the body, which contains the projection surface or screen.

Portable microfilm equipment of this kind should generally be as small and easy to handle as possible. It is a familiar practice to further this end by mounting the deflection mirror that projects upward from the body so that it can be rotated into a space-saving position, in order to have the flattest possible device when the cover is closed.

In the know equipment of the kind mentioned above, however, the operator must use several manipulations in order to bring the device from its collapsed state into an unfolded state ready for operation, and vice versa. In particular, the deflection mirror must be rotated each time by hand into the position desired on that occasion.

It is therefore among the objects of the invention to provide a portable microfilm reader which affords increased facility in operation by the use of simple and reliable mechanism.

In accordance with the invention there is provided a device that rotates the deflection mirror, the mirror being mechanically connected to the upper hollow cover of the case in such a manner that it is activated by the rotation of the cover. As a result, the operator no longer has to fold the deflection mirror in or out; instead, the deflection mirror takes its required position automatically according to the position of the cover of the case. When the cover is folded down, the deflection mirror is automatically tipped into a space-saving position. When the cover is opened up, it automatically swings back into its operating position.

Further advantageous features of the invention provide that the mechanism that rotates the deflection mirror includes a connecting rod the rear end of which projects into the path described by part of the cover of the device when the cover is closed, in particular in the path traversed by the wall of the case that has on it the hinge joints connecting the upper and lower parts of the case, that a spring element is provided which presses the connecting rod against the wall of the case which mounts the hinge joints, and that the mechanism contains a connecting rod, the front end of which presses against the deflection mirror at a position eccentric of the pivotal axis of the mirror.

The rear wall of the cover thus presses the connecting rod forward when the cover is closed. In a first embodiment of the invention, this movement is transferred to a second connecting rod, which rotates the deflection mirror into a horizontal, space-saving position. When the cover is opened, the deflection mirror is automatically rotated back into operating position by the force of the spring pressing against the second connecting rod.

In a second illustrative embodiment of the invention, the device that rotates the deflection mirror employs a single connecting rod the front end of which is engaged with the folding mirror and the back end of which is engaged with the cover of the case. This is a particularly simple and therefore functionally reliable and economical arrangement.

A particularly advantageous feature of the invention is the provision of a mechanical connection of the mechanism that rotates the deflection mirror to a switch that breaks the electrical circuit of projecting in the body of the reader. By this means the operating facility and the operational safety of the reader are further increased, since now when the cover is closed the electrical circuit of the illumination lamp is automatically broken and the device is automatically turned off when the cover is closed. Specifically, one of the connecting rods bears, for this purpose, a lifting cam for a lever that activates the switch.

Several forms of construction of the invention are described below and explained in detail by means of the drawings. In the drawing:

FIG. 4 is a diagram of the electrical circuit of the projecting lamp.

Figure 1:
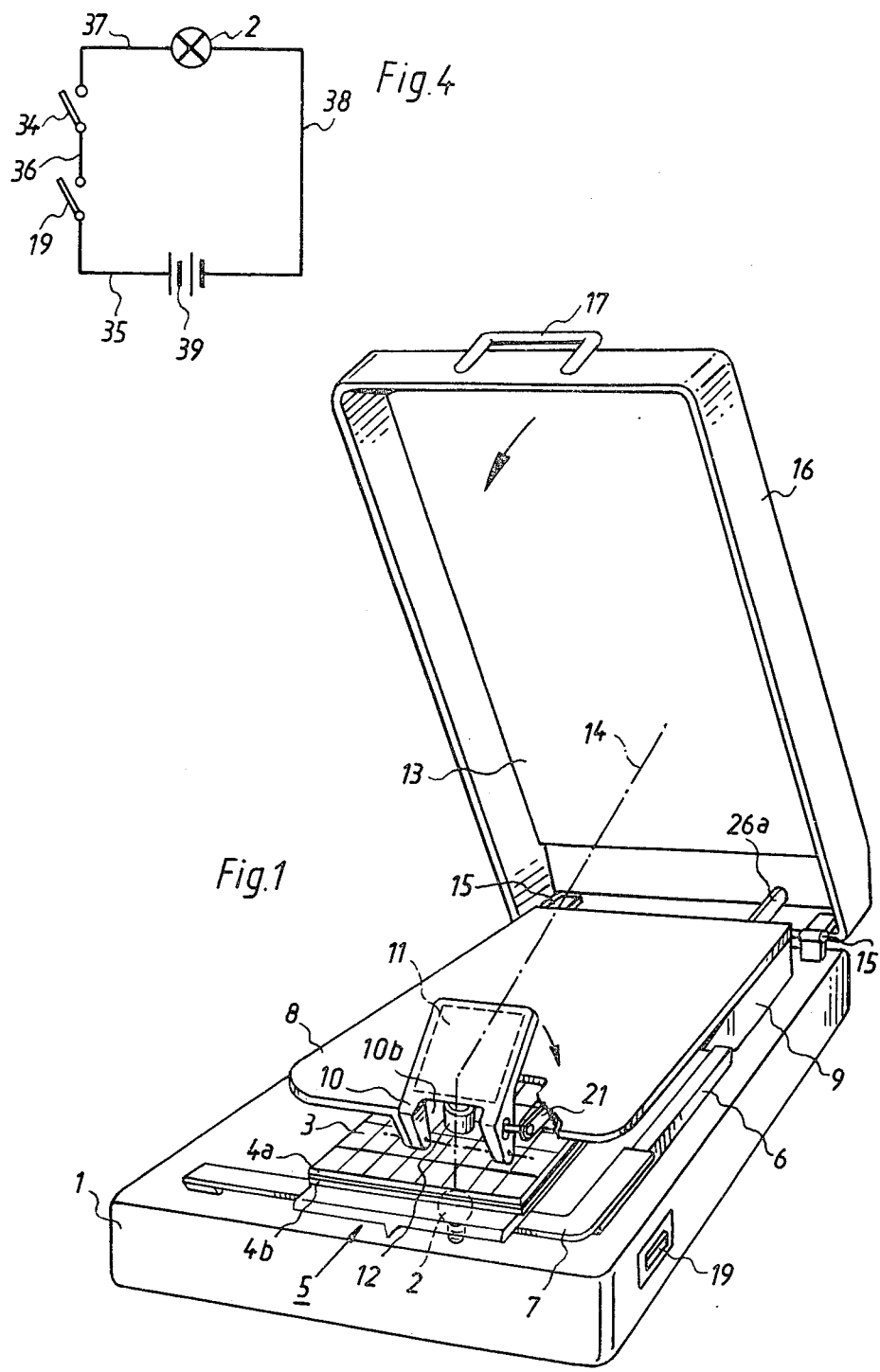
FIG. 1 is a view in perspective of a portable microfilm reader pursuant to the invention.

In FIG. 1 there is shown a projecting lamp 2 located in a lower body 1 of the reader; lamp 2 illuminates the frame of a micro-fiche 3 which is to be viewed. This micro-fiche is placed between two transparent plates 4a, 4b of a film stage 5 mounted on guide bars 6, 7 so that stage 5 can be moved in either of directions X and Y.

A cover plate 8 is fastened to the body 1 over a base 9. A deflection mirror 11, fixed in a frame 10, is pivotally mounted at the front part of this cover plate. The frame of microfilm to be viewed is projected through a lens 12 mounted in the cover plate, via the deflection mirror 11 onto the projection surface 13 mounted inside a hollow cover 16 for the reader. The dot-dash line 14 indicates the optical axis of the projection beam.

The cover 16 is fastened to the body 1 by means of hinge joints 15. A handle 17 attached to the cover is used to carry the device when it is collapsed. The device can be turned on and off by a manually-operated switch 19.

Figure 2:
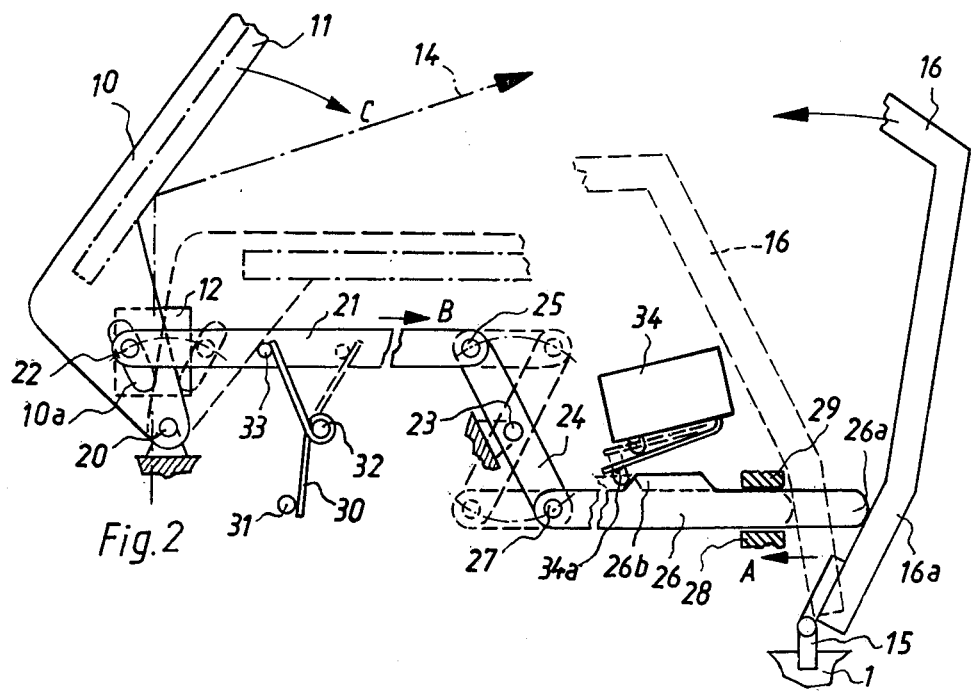
FIG. 2 is a view in side elevation of a first embodiment of the mechanism for rotating the mirror and breaking the illumination circuit.

The mechanism for folding the mirror and automatically breaking the electric circuit of the illumination lamp is shown in detail in FIG. 2. In such figure, the parts are shown in full lines in the positions they assume when the cover is open, and in phantom lines in the positions they occupy when the cover is partially closed. The mirror holder 10 is pivotally mounted on an axle 20 fixed to the device, and has in its side a cam slot 10a which slidingly receives a pin 22 which is fastened to the front end of a connecting rod 21. One end of a first-class swivel lever 24 pivotally mounted on pivot pin 23 fixed to the device is pivotally connected to the end of the connecting rod 21 by a pivot pin 25, the other end of swivel lever 24 is pivotally connected to one end of a connecting rod 26 by pivot pin 27. The connecting rod 26, which is guided through fixed guide surfaces 28, 29, has its rear end 26a in engagement with the rear wall 16a of the cover 16, which, as above-noted, is connected by hinge joints 15 with the body 1 of the device. A spring clip 30 engages fixed pins 31, 32, which are attached to the device, and presses against a pin 33 fastened to the connecting rod 21. Spring 30 thrusts the rear end 26a of the connecting rod 26 against rear wall 16a of the cover, so that the cover 16 and the mirror 11 move together as the cover is turned from the closed to the open position, and vice versa.

On the upper side of the connecting rod 26 there is a lifting cam 26b for activating the lever 34a of a microswitch 34 mounted firmly on the device. This microswitch 34 is arranged, as shown in FIG. 4, in the circuit 35–38 of the projecting lamp 2, which is energized by a voltage source 39. The manually-operated switch 19 is connected in series with the microswitch 34, as shown.

The mechanism shown in FIGS. 1, 2 and 4 functions in the following manner:

Upon closing the cover 16, the connecting rod 26 is driven from the wall 16a of the cover in the direction of arrow A. By means of the swivel lever 24, this motion is transmitted to the connecting rod 22 in the reverse direction B. As a result, the deflection mirror 11 is rotated in the direction of arrow C by the pin 22 and the cam slot 10a of the mirror holder 10. When the cover is closed, as indicated in FIG. 2 in phantom lines, the mirror together with its holder is folded in a horizontal position parallel to the upper wall of the cover.

When the cover is closed, the cam 26b is moved along with the connecting rod 26 in the direction of arrow A, so that the activating lever 34a of the microswitch 34 rides up cam 26a and thereby activates the microswitch. As a result, the switch 34 is opened, so that the circuit of the illumination lamp 2 (see FIG. 4) is also broken in the event that the device was not turned off by means of the operating switch 19 prior to the closing of the case.

Due to the mechanical connection of the connecting rod drive with the deflection mirror on the one hand, and the microswitch on the other, the switch 34 is always opened simultaneously with the folding of the mirror. This has the additional advantage that the projecting lamp 2 is automatically turned off in the event that, when the cover is open, the deflection mirror is rotated by hand into its horizontal position, in order to change or clean the lens 12 through the opening 10b in the mirror holder. This precludes the dazzling of the operator without his having first to use the operating switch 19 for this purpose.

When the cover is opened, the spring 30 causes the deflection mirror 11 automatically to rotate back into its operating position and the switch 34 to close, so that if the operating switch 19 is likewise closed the reader is immediately ready for use.

Figure 3:
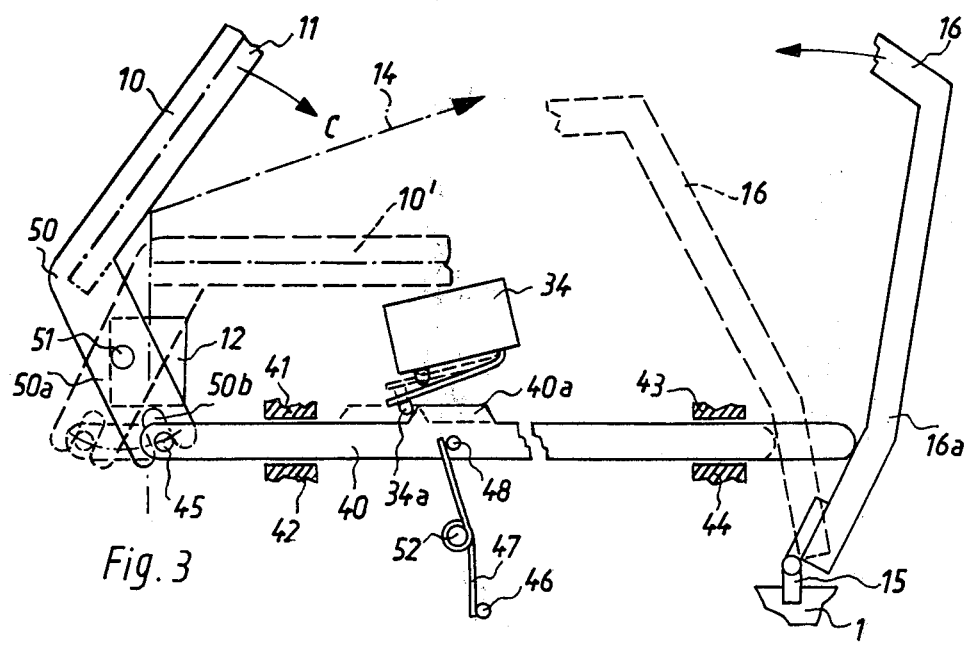
FIG. 3 is a view similar to that of FIG. 2 of a second embodiment of such mechanism with a single connecting rod.

In a particularly simple design of the invention shown in FIG. 3, a single connecting rod 40 is provided between the cover and the mirror. This connecting rod 40 is guided by fixed guide elements 41–44 and is pressed against the rear wall 16a of the cover by means of a spring 47 mounted upon fixed pins 52, 46, one wing of the spring pressing against a pin 48 fastened to the connecting rod 40. A pin 45 fastened to the front end of the connecting rod 40 fits into a groove-like recess 50b of a lever-like extension 50a of the mirror holder 50 mounted on a stationary pivot pin 51. The other elements shown in FIG. 3 correspond to the elements shown in FIGS. 1 and 2 and are designated by the same reference numbers. This mechanism functions in the same manner as the mechanism shown in FIGS. 1 and 2; the cover and mirror are shown in full lines in their erected positions, and in phantom lines in their closed or partially-collapsed positions.

Although the invention is illustrated and described with relation to a preferred plurality of embodiments, it is to be expressly understood that it is in no way limited by the disclosure of such a plurality of embodiments, but is capable of numerous modifications within the scope of the appended claims.

What is claimed is:

1. In a portable microfim reader having a body, a projection light source projecting a light beam mounted in the body, a projection surface, a deflection mirror pivotally mounted on the body, the mirror deflecting onto the projection surface the projection beam which proceeds from a frame of microfilm that is to be viewed, and a cover hingedly attached to the rear of the body, said cover containing the projection surface, the improvement comprising a mechanism adapted to automatically lift the deflection mirror into an erected, operative position when the cover is fully manually opened, and adapted to automatically fold the deflection mirror when the cover is manually closed, said mechanism including linking means operationally mounted in said body which transmit the pivotal movement of said cover to said deflection mirror, so that said deflection mirror is automatically pivoted when said cover is manually pivoted, said linking means comprising at least one first linking rod slidably, movably mounted in said body and having a free end in contact with said cover; and biasing means urging said free end of said first linking rod into contact with said cover.

2. A portable microfilm reader as in claim 1, wherein the mechanism contains a second connecting rod connected mechanically to the first linking rod, the front end of the first rod pressing against a part of the deflection mirror eccentric of the pivotal axis of the mirror.

3. A potable microfilm reader as in claim 1, wherein said linking means contains a single linking rod, the front end of the linking rod pressing against a part of the deflection mirror eccentric of the pivotal axis of the mirror, the rear end of the linking rod interacting with the cover of the device.

4. A portable microfilm reader as in claim 1, comprising a switch that breaks the electrical circuit of the projection light source, the switch being operated by the mechanism that tilts the deflection mirror in such manner that the switch is opened when the cover is closed.

5. A portable microfilm reader as in claim 4, wherein the linking rod has on it a cam for actuating a member that closes the switch.

6. A portable microfilm reader as in claim 1, comprising at least one hinge joint between the cover and the body, and a spring element which presses the connecting rod agsint the wall of the cover that bears the hinge joint.

* * * * *